(12) United States Patent
Piersol et al.

(10) Patent No.: US 11,710,478 B2
(45) Date of Patent: *Jul. 25, 2023

(54) PRE-WAKEWORD SPEECH PROCESSING

(71) Applicant: Amazon Technologies, Inc., Seattle, WA (US)

(72) Inventors: Kurt Wesley Piersol, San Jose, CA (US); Gabriel Beddingfield, Freemont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 62 days.

This patent is subject to a terminal disclaimer.

(21) Appl. No.: 17/232,609

(22) Filed: Apr. 16, 2021

(65) Prior Publication Data

US 2021/0233515 A1 Jul. 29, 2021

Related U.S. Application Data

(63) Continuation of application No. 16/813,194, filed on Mar. 9, 2020, now abandoned, which is a continuation of application No. 16/256,376, filed on Jan. 24, 2019, now Pat. No. 10,643,606, which is a continuation of application No. 14/672,277, filed on Mar. 30, 2015, now Pat. No. 10,192,546.

(51) Int. Cl.
*G10L 15/08* (2006.01)
*G10L 25/87* (2013.01)
*G10L 17/22* (2013.01)

(52) U.S. Cl.
CPC .............. *G10L 15/08* (2013.01); *G10L 17/22* (2013.01); *G10L 25/87* (2013.01)

(58) Field of Classification Search
CPC ................................ G10L 15/08; G10L 17/22
USPC ........................................................ 704/254
See application file for complete search history.

(56) References Cited

U.S. PATENT DOCUMENTS

| | | | | |
|---|---|---|---|---|
| 5,619,554 A * | 4/1997 | Hogan | ................... | G10L 15/26 379/88.08 |
| 6,993,245 B1 * | 1/2006 | Harville | ................... | H04N 5/76 386/E5.001 |
| 8,165,886 B1 * | 4/2012 | Gagnon | ................... | G10L 15/19 715/728 |
| 8,363,808 B1 * | 1/2013 | Bland | ................... | H04M 3/566 709/227 |
| 9,275,637 B1 * | 3/2016 | Salvador | ................. | G10L 15/06 |
| 9,368,105 B1 * | 6/2016 | Freed | ..................... | G10L 15/22 |
| 9,548,053 B1 * | 1/2017 | Basye | ..................... | G10L 15/22 |
| 10,051,366 B1 * | 8/2018 | Buoni | ..................... | G10L 15/22 |
| 10,192,546 B1 * | 1/2019 | Piersol | ................... | G10L 15/08 |
| 10,643,606 B2 * | 5/2020 | Piersol | ................... | G10L 17/22 |
| 2002/0198722 A1 * | 12/2002 | Yuschik | ............. | G10L 15/1822 704/E15.04 |

(Continued)

*Primary Examiner* — Edwin S Leland, III
(74) *Attorney, Agent, or Firm* — Pierce Atwood LLP

(57) ABSTRACT

A system for capturing and processing portions of a spoken utterance command that may occur before a wakeword. The system buffers incoming audio and indicates locations in the audio where the utterance changes, for example when a long pause is detected. When the system detects a wakeword within a particular utterance, the system determines the most recent utterance change location prior to the wakeword and sends the audio from that location to the end of the command utterance to a server for further speech processing.

20 Claims, 10 Drawing Sheets

(56) References Cited

U.S. PATENT DOCUMENTS

| | | | |
|---|---|---|---|
| 2006/0235688 A1* | 10/2006 | Bicego | G10L 13/04 704/E15.045 |
| 2007/0061152 A1* | 3/2007 | Doi | G10L 15/26 704/277 |
| 2008/0137558 A1* | 6/2008 | Baird | H04L 12/1831 370/260 |
| 2011/0055256 A1* | 3/2011 | Phillips | G06F 16/9535 707/769 |
| 2012/0010873 A1* | 1/2012 | Kim | G10L 15/26 704/E15.001 |
| 2013/0226583 A1* | 8/2013 | Kadirkamanathan | G10L 15/005 704/254 |
| 2013/0275138 A1* | 10/2013 | Gruber | G10L 13/00 704/260 |
| 2013/0275875 A1* | 10/2013 | Gruber | G06F 3/167 715/728 |
| 2013/0275899 A1* | 10/2013 | Schubert | H04M 1/72463 715/765 |
| 2014/0277735 A1* | 9/2014 | Breazeal | B25J 9/0003 700/259 |
| 2014/0278443 A1* | 9/2014 | Gunn | G10L 17/22 704/275 |
| 2014/0350918 A1* | 11/2014 | Liu | G06F 40/30 704/9 |
| 2015/0058013 A1* | 2/2015 | Pakhomov | G10L 25/87 704/243 |
| 2015/0095032 A1* | 4/2015 | Li | G10L 15/083 704/255 |
| 2015/0206544 A1* | 7/2015 | Carter | G10L 15/04 704/235 |
| 2015/0245154 A1* | 8/2015 | Dadu | G10L 19/0018 381/56 |
| 2015/0255069 A1* | 9/2015 | Adams | G10L 15/08 704/236 |
| 2015/0373236 A1* | 12/2015 | Thorn | H04N 5/772 348/158 |
| 2016/0044160 A1* | 2/2016 | Redmann | H04M 3/436 379/88.03 |
| 2016/0055847 A1* | 2/2016 | Dahan | G10L 15/08 704/275 |
| 2018/0082684 A1* | 3/2018 | Gunn | G10L 17/24 |
| 2018/0090127 A1* | 3/2018 | Hofer | G10L 15/07 |
| 2020/0279552 A1* | 9/2020 | Piersol | G10L 17/22 |

* cited by examiner

FIG. 1
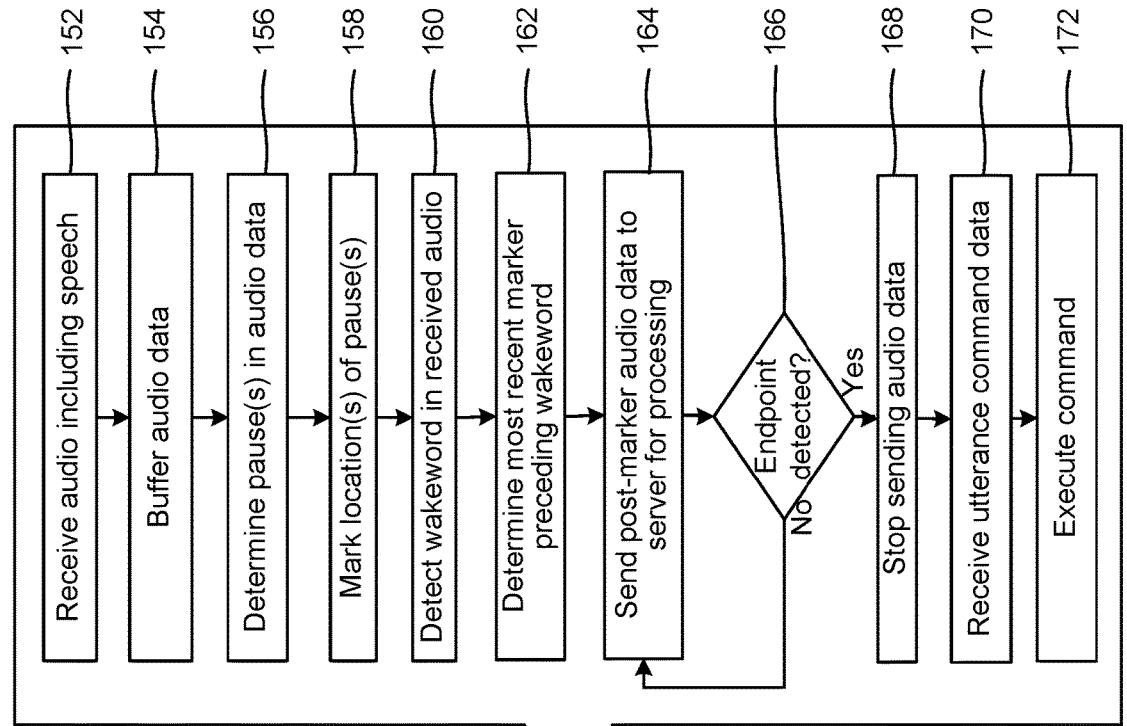
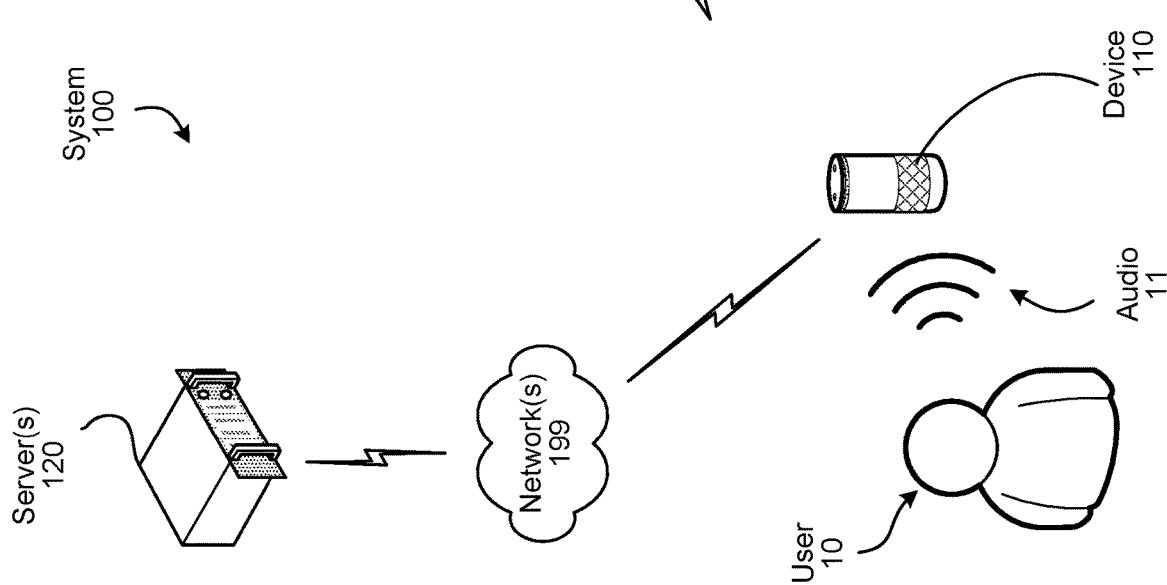

PRE-WAKEWORD SPEECH PROCESSING

CROSS-REFERENCE TO RELATED APPLICATION

This application is a continuation of, and claims the benefit of priority of, U.S. Non-provisional patent application Ser. No. 16/813,194, filed on Mar. 9, 2020, and entitled "PRE-WAKEWORD SPEECH PROCESSING," which is a continuation of, and claims the benefit of priority of, U.S. Non-provisional patent application Ser. No. 16/256,376, filed on Jan. 24, 2019, and entitled "PRE-WAKEWORD SPEECH PROCESSING," issued as U.S. Pat. No. 10,643,606, which is a continuation of, and claims the benefit of priority of, U.S. Non-provisional patent application Ser. No. 14/672,277, filed on Mar. 30, 2015, and entitled "PRE-WAKEWORD SPEECH PROCESSING," issued as U.S. Pat. No. 10,192,546, the contents of each of which is expressly incorporated herein by reference in its entirety.

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system for automatic speech recognition (ASR) according to embodiments of the present disclosure.

DETAILED DESCRIPTION

Figure 2:
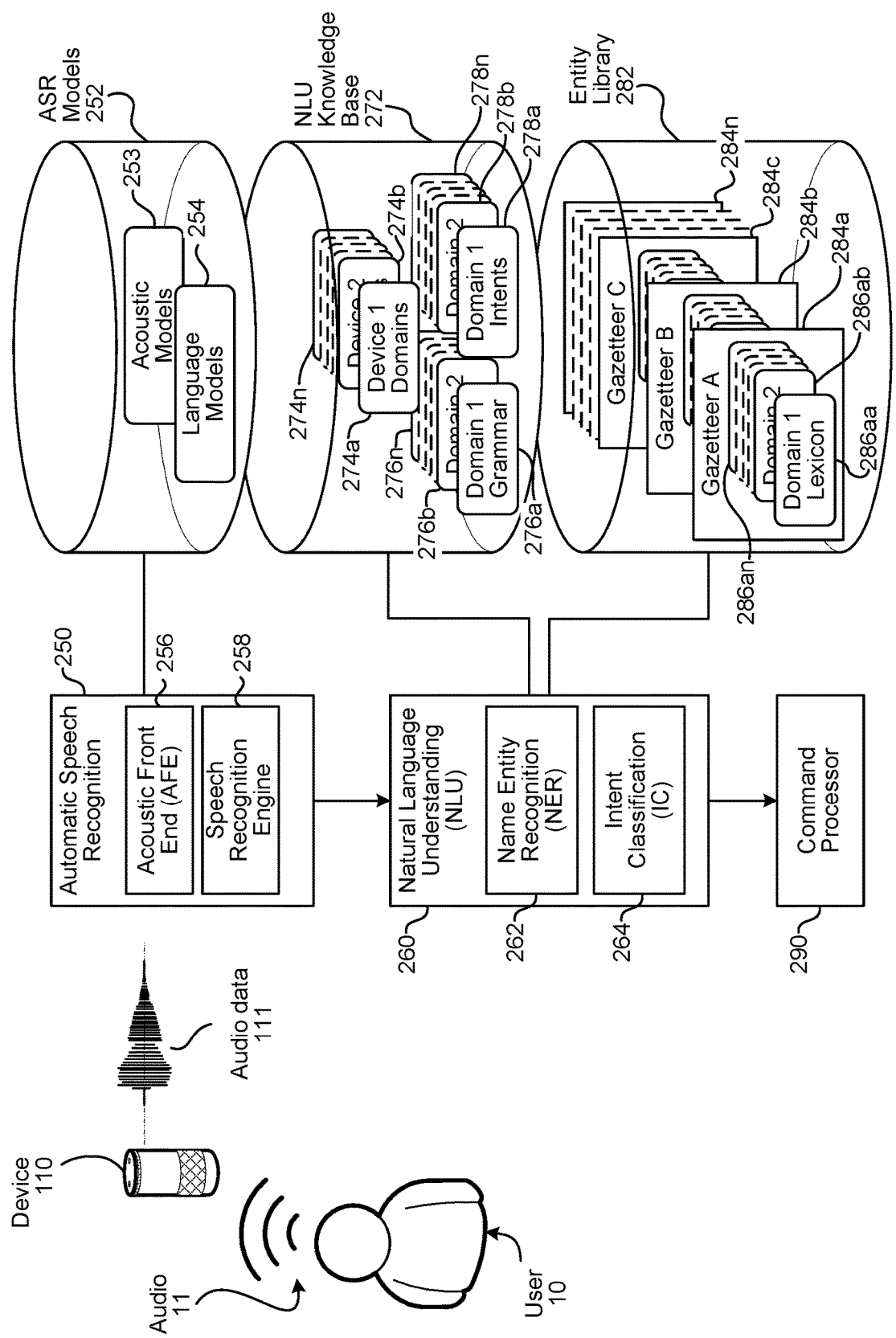
FIG. 2 is a conceptual diagram of how a spoken utterance may be processed according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used to when performing speech processing. A typical such distributed environment may involve a local device having one or more microphones being configured to capture sounds from a user speaking and convert those sounds into an audio signal. The audio signal may then be sent to a downstream remote device for further processing, such as converting the audio signal into an ultimate command. The command may then be executed by a combination of remote and local devices depending on the command itself.

As part of a distributed speech processing system, a local device may be configured to continuously send all detected audio to the remote device. There are several drawbacks to such an approach. One drawback is that such communications would require significant bandwidth and networking resources. Another drawback to such an approach is that privacy concerns may make it undesirable for a local device to send all captured audio to a remote device. A still further drawback is that a remote device may waste significant computing resources processing all incoming audio when no commands are being issued in the majority of the audio.

To account for these problems, a local device may be configured to only activate upon a user speaking a particular waking command to wake the local device so the user may speak a further command. The waking command (which may be referred to as a wakeword), may include an indication for the system to perform further processing. The local device may continually listen for the wakeword and may disregard any audio detected that does not include the wakeword. Typically, systems are configured to detect a wakeword, and then process any subsequent audio following the wakeword (plus perhaps a fixed, but short amount of audio pre-wakeword) to detect any commands in the subsequent audio. As an example, a wakeword may include a name by which a user refers to a device. Thus, if the device was named "Alexa," and the wakeword was "Alexa," a user may command a voice controlled device to play music by saying "Alexa, play some music." The device, recognizing the wakeword "Alexa" would understand the subsequent audio (in this example, "play some music") to include a command of some sort and would perform speech processing on that audio to determine what the command is for execution. Provided services/commands may include performing actions or activities, rendering media, obtaining and/or providing information, providing information via generated or synthesized speech via a local device, initiating Internet-based services on behalf of the user, and so forth.

One drawback to this approach, however, is that a user may not always structure a spoken command in the form of a wakeword followed by a command (e.g., "Alexa, play some music"). Instead, a user may include the command before the wakeword (e.g., "play some music Alexa") or even insert the wakeword in the middle of a command (e.g., "play some music Alexa, the Beatles please"). While such phrasings may be natural for a user, current speech processing systems are not configured to handle commands that are not preceded by a wakeword.

Offered is a system to correct this problem. The present system is configured to capture speech that precedes and/or follows a wakeword, such that the speech associated with the command and wakeword can be included together and considered part of a single utterance that may be processed by a system. To perform speech processing with a variable wakeword location, a system may be configured to buffer input speech. As speech is buffered, the system may insert markers or indications in the buffered speech that are likely to correspond to subject changes, which may in turn correspond to spoken commands. Further, as speech is buffered the system may perform wakeword detection. When a wakeword is detected, the system may look backwards to the most recent marker that preceded the wakeword. That marker represents a location where the command likely began. Speech from that marker to an endpoint (discussed below) may then be grouped as a single utterance and sent for speech processing. In this manner a speech processing system may be configured to capture and process commands where the substance of the command does not necessarily immediately trail the wakeword. Further, a system configured in the manner need not necessarily perform full ASR processing (including remote ASR processing) on all detected speech, thus addressing privacy concerns associated with an "always on" speech processing system.

FIG. 1 illustrates a system such as the one described above. As illustrated, a system 100 may include a speech controlled device 110 at the location of a user 10. The device 110 may be connected over a network 199 to one or more server(s) 120. The system 100 may be a distributed speech processing system where the device 110 captures audio 11 spoken by the user 10, converts it to audio data, sends the audio data to a server(s) and the server(s) perform speech processing on the audio data as described below in reference to FIG. 2. The device 110 receives (152) audio including speech from one or more microphones of the device. As the audio is received, the device 110 buffers (154) audio data corresponding to the audio in one or more memory buffers of the device. The device may also store timestamps associated with the respective audio data to indicate when the audio data was received. The device determines (156) pauses in the audio data that may indicate changes in conversation or subject matter in the speech of the audio. The device 110 marks (158) the location(s) of the pauses in the buffered audio data. This may include inserting a data indicator into the audio data or may include creating a separate list of times in the audio data (and/or corresponding buffer locations) associated with the pauses.

The buffer(s) used by the device 110 may be circular buffers, such that a predetermined amount of audio data is stored and then circularly rewritten as new audio is received by the device. The size and specific configuration of the buffer(s) is configurable using techniques known in the art.

As the device 110 detects audio it may process the audio (either before or after the audio is stored in the buffer) to determine if the audio includes a wakeword. The device 110 may continue to do so until it detects (160) a wakeword in the received audio. The device 110 may also determine a timestamp of the wakeword to determine when the wakeword was received relative to other audio in the buffer. The device may then determine (162) a most recent marker preceding the wakeword. This marker may indicate the beginning of an utterance associated with a wakeword. In an utterance when a wakeword precedes the command the marker may indicate a time nearby to the wakeword in the audio timeline. If the wakeword is at the middle, or at the end of a command, the marker may indicate a time separated from the wakeword by a number of words. The device may then send (164) audio data of the utterance (which may be referred to as utterance audio data) to a server for processing. The utterance audio data may begin at the marker preceding the wakeword determined above at step 162. The utterance audio data thus represents the audio data that the device 110 has determined should be considered part of the wakeword's command utterance, namely the audio data including speech from the marked location to an end of the utterance. The utterance audio data may include raw audio data or processed audio data (e.g., feature vectors, etc.) representing the spoken utterance from the marked location to the endpoint. As used herein, the term location, where referred to in reference to a location within speech, audio, audio data, or similar such situation may refer to a temporal location, for example a relative or absolute (i.e., "wall clock") time as may be determined by a timestamp and thus compared to other timestamps to determine relative location within the speech, audio, audio data, etc. The device may check to see if the audio has reached the end of the utterance (also called the endpoint), for example using endpointing techniques discussed below. If not (166: No), the device may continue to send (164) audio data to the server for processing. That audio data may come from the buffer or may come directly from incoming audio (particularly once audio data past the wakeword is being sent). The device may continue sending audio data to the server until an endpoint of the utterance is detected (166: Yes). The device may then stop sending audio data (168). The server may perform speech processing on the utterance audio data (for example, as the audio data is being received by the server). The server may then send to the device 110 command data representing the spoken command that was included in the utterance. The device 110 may receive (170) the command data and may execute (172) the command, for example playing music, etc.

Alternatively, instead of continuing to send audio data to the server as it is being received, the device may determine the marker location and then determine the endpoint of the utterance. The device may then determine that the audio data from between the marker's indicated location and the endpoint should be included as utterance audio data.

As noted below, the system may device 110 may perform other operations on received audio to isolate and determine a spoken command, which may then be processed by the system 100 as described below. The device 110 may be a device that detects video and audio (such as a video camera, device with a camera and microphone, etc.), and where an audio signal is included as part of a video signal and represents audio corresponding to images of the video signal. In such a situation, the device may also send video data from the video signal to a remote device for processing. For example, the device may determine video data corresponding to the audio data from the determined marker (e.g., the marker detected above at step 162) to the detected endpoint of an utterance (e.g., the endpoint detected at step 166). The device may also send that video data (which corresponds to the utterance that includes the wakeword) to the system for processing such as facial recognition, improved speaker identification, or other image processes. In one embodiment, the utterance may be a command to record something using a camera, in which case determining the video data corresponding to the utterance may be useful in preserving the video of the command, particularly if the wakeword occurs in the middle of an utterance.

The system 100 of FIG. 1 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. The system may include a device 110, which may be a general purpose device (such as a mobile phone, tablet, etc.) or a specific purposes device such as an audio device configured to play music. Although the teachings below apply to many different types of devices 110, for present purposes operation of the system may be illustrated using the example of an audio device 110. The audio device 110 may include a plurality of applications that are configured to work in conjunction with other elements of the audio device 110 to provide services and functionality. The applications may include media playback services such as music players. Other services or operations performed or provided by the applications may include, as examples, requesting and consuming entertainment (e.g., gaming, finding and playing music, movies or other content, etc.), personal management (e.g., calendaring, note taking, etc.), online shopping, financial transactions, database inquiries, and so forth. In some embodiments, the applications may be pre-installed on the audio device 110, and may implement core functionality of the audio device 110. In other embodiments, one or more of the applications may be installed by the user 10, or otherwise installed after the audio device 110 has been initialized by the user 10, and may implement additional or customized functionality as desired by the user 10.

An audio capture component, such as a microphone of the audio device 110, captures audio 11 corresponding to a spoken utterance, which may include a command. The spoken utterance is spoken by a user 10 and captured by the device 110. Details for capturing the spoken utterance, such as determining the beginning and/or end of the utterance and configuring an audio signal including audio data corresponding to the utterance, is discussed below. Audio data 111 comprising a representation of the utterance may be sent to an ASR component 250. The ASR component 250 may be local to the audio device 110 and/or located on a remote server 120. The ASR component 250 converts the audio into text. The ASR component 250 thus transcribes audio data into text data representing the words of the speech contained in the audio data. The text data may then be used by other downstream components for various purposes, such as executing system commands, inputting data, etc. The downstream component may be any number of components or applications that operate on ASR output. Although many such downstream applications are envisioned for these techniques, for purposes of illustration this description will use an NLU process and application as the NLU process illustrates the benefits of early ASR output as described below. For example, the NLU process may take ASR output and determine, for example, the actions (sometimes referred to as a command, "application response" or "app response") based on the recognized speech of the early ASR output.

A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model or dialog-based interactive voice response (IVR) system)). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a set of values, called a feature vector, representing the features/qualities of the utterance portion within the frame. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. The AFE 256 may be located on a device 110 or on a server 120. If on a device 110, the device may send the output of the AFE, such as the feature vectors, over a network 199 to the server 120 for further processing.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the appliance 110 may process audio data into feature vectors and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a search engine, etc.)

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU knowledge base 272 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 262 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on audio device 110 or in a music playing appliance, configured to execute a music playing command. The server may configure data corresponding to the command included in the utterance (which may be referred to as utterance command data). Depending on system configuration the utterance command data may be created by and output from the NLU 260, in which case the command may be executed by the command processor 290 (located either on the server 120, device 110, or located elsewhere), or the utterance command data may be created by and output from the command processor 290, in which case the utterance command data may be sent to a downstream component.

Figure 3:
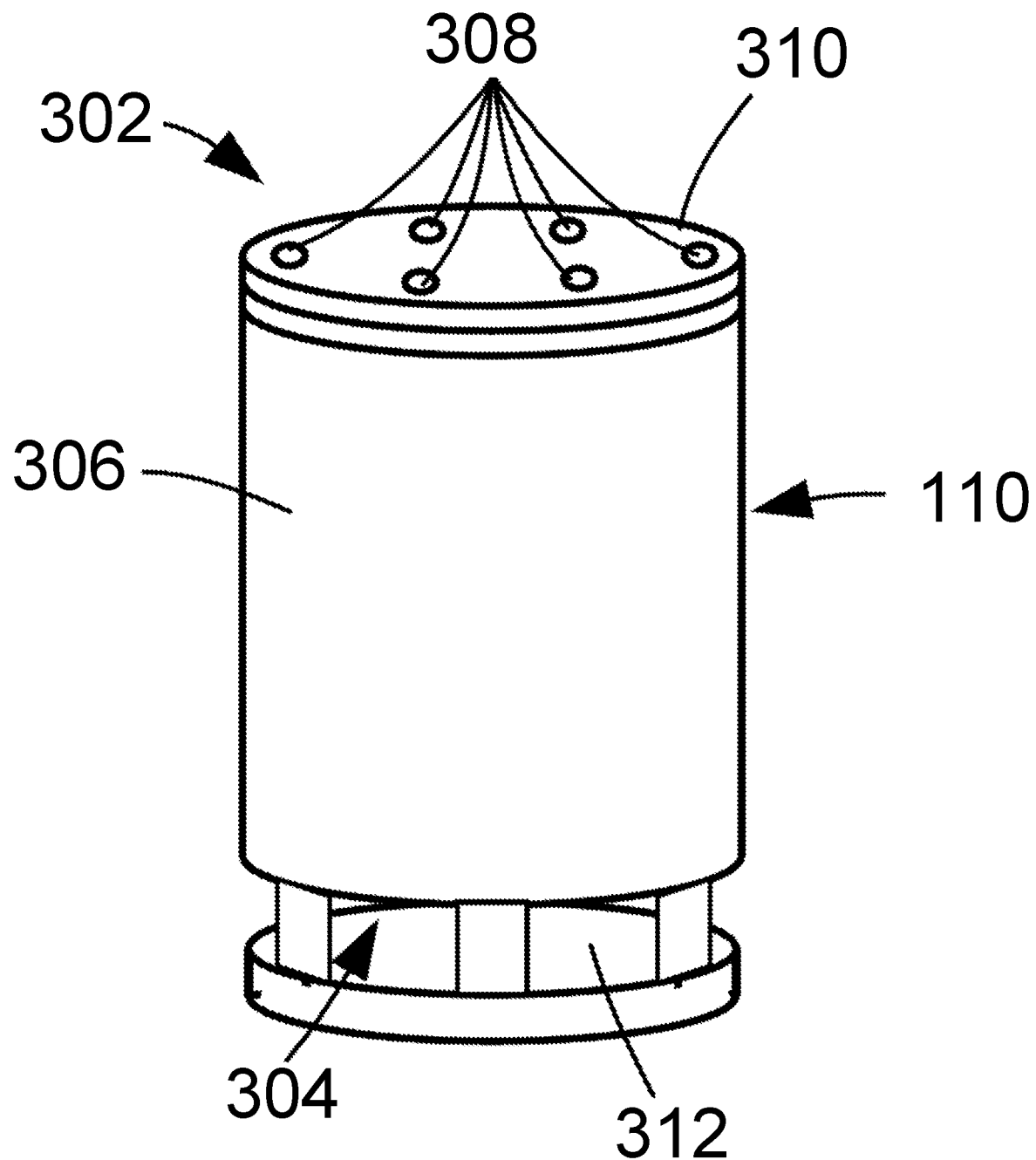
FIG. 3 is an illustration of an audio device that may be used according to embodiments of the present disclosure.

The audio device 110 may be configured with a number of components designed to improve the capture and processing of spoken commands. FIG. 3 illustrates details of microphone and speaker positioning in an example embodiment of an audio device 110. In this embodiment, the audio device 110 is housed by a cylindrical body 306. The microphone array 302 comprises six microphones 308 that are laterally spaced from each other so that they can be used by audio beamforming components to produce directional audio signals. The microphones 308 may, in some instances, be dispersed around a perimeter of the device 110 in order to apply beampatterns to audio signals based on sound captured by the microphones 308. In the illustrated embodiment, the microphones 308 are positioned in a circle or hexagon on a top surface 310 of the cylindrical body 310. Each of the microphones 308 is omnidirectional in the described embodiment, and beamforming technology is used to produce directional audio signals based on signals form the microphones 308. In other embodiments, the microphones may have directional audio reception, which may remove the need for subsequent beamforming. The microphones/beamforming techniques may be used to determine a source direction, where a direction of the source of an utterance may be determined, as described below.

In various embodiments, the microphone array 302 may include greater or less than the number of microphones shown. For example, an additional microphone may be located in the center of the top surface 310 and used in conjunction with peripheral microphones for producing directionally focused audio signals.

The speaker 304 may be located at the bottom of the cylindrical body 306, and may be configured to emit sound omnidirectionally, in a 360 degree pattern around the audio device 110. For example, the speaker 304 may comprise a round speaker element directed downwardly in the lower part of the body 306, to radiate sound radially through an omnidirectional opening or gap 312 in the lower part of the body 306. The gap may be covered by a mesh or other permeable covering to enhance the visual appeal of the device 110 without impacting the ability of the device to output audio.

Using the microphone array 302 and the plurality of microphones 308 the audio device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones in a microphone array.

The audio device may include an audio processing module 840 (illustrated in FIG. 8) that may include one or more audio beamformers or beamforming components that are configured to generate an audio signal that is focused in a direction from which user speech has been detected. More specifically, the beamforming components may be responsive to spatially separated microphone elements of the microphone array 302 to produce directional audio signals that emphasize sounds originating from different directions relative to the audio device 110, and to select and output one of the audio signals that is most likely to contain user speech.

Audio beamforming, also referred to as audio array processing, uses a microphone array having multiple microphones that are spaced from each other at known distances. Sound originating from a source is received by each of the microphones. However, because each microphone is potentially at a different distance from the sound source, a propagating sound wave arrives at each of the microphones at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

A given beampattern may be used to selectively gather signals from a particular spatial location where a signal source is present. The selected beampattern may be configured to provide gain or attenuation for the signal source. For example, the beampattern may be focused on a particular user's head allowing for the recovery of the user's speech while attenuating noise from an operating air conditioner that is across the room and in a different direction than the user relative to a device that captures the audio signals.

Such spatial selectivity by using beamforming allows for the rejection or attenuation of undesired signals outside of the beampattern. The increased selectivity of the beampattern improves signal-to-noise ratio for the audio signal. By improving the signal-to-noise ratio, the accuracy of speech recognition performed on the audio signal is improved.

The processed data from the beamformer module may then undergo additional filtering or be used directly by other modules. For example, a filter may be applied to processed data which is acquiring speech from a user to remove residual audio noise from a machine running in the environment.

Figure 4:
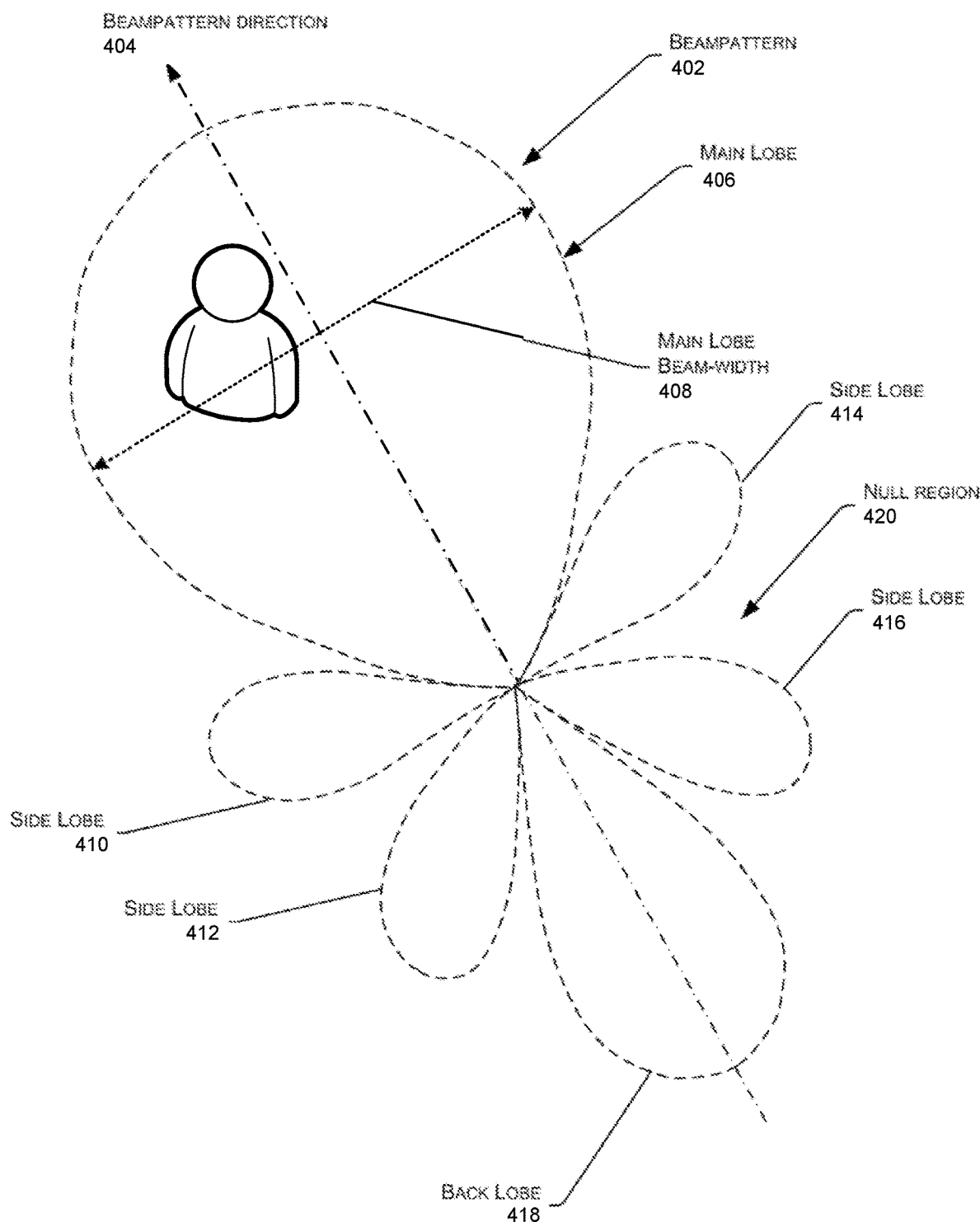
FIG. 4 is an illustration of beamforming according to embodiments of the present disclosure.

FIG. 4 illustrates a schematic of a beampattern 402 formed by applying beamforming coefficients to signal data acquired from a microphone array of the voice-controlled device 110 of FIG. 1. As mentioned above, the beampattern 402 results from the application of a set of beamformer coefficients to the signal data. The beampattern generates directions of effective gain or attenuation. In this illustration, the dashed line indicates isometric lines of gain provided by the beamforming coefficients. For example, the gain at the dashed line here may be +12 decibels (dB) relative to an isotropic microphone.

The beampattern 402 may exhibit a plurality of lobes, or regions of gain, with gain predominating in a particular direction designated the beampattern direction 404. A main lobe 406 is shown here extending along the beampattern direction 404. A main lobe beam-width 408 is shown, indicating a maximum width of the main lobe 406. In this example, the beampattern 402 also includes side lobes 410, 412, 414, and 416. Opposite the main lobe 406 along the beampattern direction 404 is the back lobe 418. Disposed around the beampattern 402 are null regions 420. These null regions are areas of attenuation to signals. In the example, the user 10 resides within the main lobe 406 and benefits from the gain provided by the beampattern 402 and exhibits an improved SNR ratio compared to a signal acquired with non-beamforming. In contrast, if the user 10 were to speak from a null region, the resulting audio signal may be significantly reduced. As shown in this illustration, the use of the beampattern provides for gain in signal acquisition compared to non-beamforming. Beamforming also allows for spatial selectivity, effectively allowing the system to "turn a deaf ear" on a signal which is not of interest. Beamforming may result in directional audio signal(s) that may then be processed by other components of the device 110 and/or system 100.

While beamforming alone may increase a signal-to-noise (SNR) ratio of an audio signal, combining known acoustic characteristics of an environment (e.g., a room impulse response (RIR)) and heuristic knowledge of previous beampattern lobe selection may provide an even better indication of a speaking user's likely location within the environment.

In some instances, a device includes multiple microphones that capture audio signals that include user speech. As is known and as used herein, "capturing" an audio signal includes a microphone transducing audio waves of captured sound to an electrical signal and a codec digitizing the signal. The device may also include functionality for applying different beampatterns to the captured audio signals, with each beampattern having multiple lobes. By identifying lobes most likely to contain user speech using the combination discussed above, the techniques enable devotion of additional processing resources of the portion of an audio signal most likely to contain user speech to provide better echo canceling and thus a cleaner SNR ratio in the resulting processed audio signal.

To determine a value of an acoustic characteristic of an environment (e.g., an RIR of the environment), the device 110 may emit sounds at known frequencies (e.g., chirps, text-to-speech audio, music or spoken word content playback, etc.) to measure a reverberant signature of the environment to generate an MR of the environment. Measured over time in an ongoing fashion, the device may be able to generate a consistent picture of the MR and the reverberant qualities of the environment, thus better enabling the device to determine or approximate where it is located in relation to walls or corners of the environment (assuming the device is stationary). Further, if the device is moved, the device may be able to determine this change by noticing a change in the RIR pattern. In conjunction with this information, by tracking which lobe of a beampattern the device most often selects as having the strongest spoken signal path over time, the device may begin to notice patterns in which lobes are selected. If a certain set of lobes (or microphones) is selected, the device can heuristically determine the user's typical speaking position in the environment. The device may devote more CPU resources to digital signal processing (DSP) techniques for that lobe or set of lobes. For example, the device may run acoustic echo cancelation (AEC) at full strength across the three most commonly targeted lobes, instead of picking a single lobe to run AEC at full strength. The techniques may thus improve subsequent automatic speech recognition (ASR) results as long as the device is not rotated or moved. And, if the device is moved, the techniques may help the device to determine this change by comparing current RIR results to historical ones to recognize differences that are significant enough to cause the device to begin processing the signal coming from all lobes approximately equally, rather than focusing only on the most commonly targeted lobes.

By focusing processing resources on a portion of an audio signal most likely to include user speech, the SNR of that portion may be increased as compared to the SNR if processing resources were spread out equally to the entire audio signal. This higher SNR for the most pertinent portion of the audio signal may increase the efficacy of the speech-recognition engine 258 when performing speech recognition on the resulting audio signal.

Using audio data detected by the device 110, either with or without using beamforming techniques, the device 110 may use various techniques to determine whether the audio input includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects.

In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110, the device may perform wakeword detection to determine when a user intends to speak a command to the device 110. As noted above, a wakeword is a special word that the device 110 is configured to recognize among the various audio inputs detected by the device 110. The wakeword is thus typically associated with a command to be executed by the device 110 and/or overall system 100. As noted above, a wakeword may not always precede a spoken command, and may sometimes be included in the middle of a spoken command. Following detection of the wakeword (described in more detail below), the system may work backwards in audio stored by a buffer to determine a location (indicated by a marker or other indicator) where in the received audio a command has likely begun. The system may then perform speech processing on the audio signal from between that command beginning marker to an endpoint (discussed below) to process the speech and execute the resulting command.

To determine the beginning of an audio command, a number of techniques may be used. In one embodiment the system may determine pauses in spoken words and may interpret those pauses as potential breaks in a conversation. Those breaks in a conversation may be considered as breaks between utterances and thus considered the beginning, or a begin point, of an utterance. The beginning of an utterance may also be detected using speech/voice characteristics. Other techniques may also be used to determine the beginning of an utterance.

To determine if an utterance has begun, a speech begin point detection algorithm may determine if an utterance has begun (also called beginpointing). Beginpointing may be based on pauses detected in speech. Pause detection may be based on the number of silence/non-speech audio frames, for instance the number of consecutive silence/non-speech frames. Energy based or acoustic model based VAD may be used in these algorithms. For example, a previous utterance may be deemed ended, and a new one begun, when the voice activity detector sees a certain number of non-speech audio frames.

Machine learning techniques may also be used for beginpointing. For example, during a training phase, training data is selected for a model, which may be a language model. Tags representing the length of pauses and semantic content of potential utterances are identified and inserted in the training data for the model. During run time processing, the model and sematic tags representing the length of pauses in speech are used to determine the likelihood that the system should await more speech before determining the end of an utterance. Depending on the determination, the number of frames of non-speech that may be processed before the beginning of the utterance is established is adjusted. The number of non-speech frames prior to detected speech may determine when the device/system determines the beginning of the utterance.

Begin point determination may be performed by determining an energy level of the audio input. In some embodiments, the beginpointing/audio detection may include a low-power digital signal processor (or other type of processor) configured to determine an energy level (such as a volume, intensity, amplitude, etc.) of an obtained audio input and for comparing the energy level of the audio input to an energy level threshold. The energy level threshold may be set according to user input, or may be set by a device. In some embodiments, the beginpointing/audio detection may be further configured to determine that the audio input has an energy level satisfying a threshold for at least a threshold duration of time. In such embodiments, high-energy audio inputs of relatively short duration, which may correspond to sudden noises that are relatively unlikely to include speech, may be ignored. The beginpointing/audio detection may compare the energy level to the energy level threshold (and optionally to the threshold duration) to determine whether the energy level threshold is met.

If the beginpointing/audio detection determines that the obtained audio input has an energy level satisfying an energy level threshold it may process audio input to determine whether the audio input includes speech. In some embodiments, the beginpointing/audio detection works in conjunction with digital signal processing to implement one or more techniques to determine whether the audio input includes speech. Some embodiments may apply VAD techniques, such as harmonicity detection. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the beginpointing/audio detection implements a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models, which acoustic models may include models corresponding to speech, noise (such as environmental noise or background noise), or silence/non-speech. Still other techniques may be used to determine whether speech is present in the audio input.

The length of a pause sufficient to qualify the pause as the beginning of a new utterance (as opposed to the continuation of an utterance in progress) may depend on the identity of the speaker. If the system is configured to perform speaker identification (techniques for which are known in the art), the system may identify the speaker and adjust the pause length sufficient to determine a beginpoint accordingly. The system may also be configured to learn pause tendencies of different speakers and to adjust its beginpointing processing accordingly. For example, during system training/enrollment, a speaker's pause tendencies between utterances or between topics may be recorded and used to train the beginpointing processing of the system. Such tendencies may also be recorded at runtime and used to further adjust the system. Different pause lengths may also be configured for different spoken languages as the pause length may vary depending on the language spoken (for example pauses in conversational English may be different from pauses in conversational Spanish). The spoken language may be determined by analyzing the received audio but may also be determined using other techniques, for example using a language associated with the user 10 (for example in the user profile), a language associated with the device's location (for example as determined by GPS coordinates), a language associated with electronic content (for example, books, music or other content purchased by or displayed/played back by the device 110), etc.

The start of an utterance may also be determined by various characteristics of the speech including pitch, prosody, volume, rhythm, stress, intonation, cepstrum, etc. of the speech which may be determined by audio and/or speech processing components of the device (such as modules 840 or 850 discussed below). For example, a rising or falling tone of a voice may indicate a new utterance, the beginning of a command, etc. The system may train on voice characteristics (which may or may not be also tied to speaker identity) that indicate when an utterance begins, and thus when a location in the speech should be marked by the system.

Using various ones of the techniques described above, the beginpointing/audio detection may determine a confidence level whose value corresponds to a likelihood that the location of the beginpoint represents the start of a new utterance/command. The confidence score may depend on factors such as the technique used to determine the marker, the length of the pause, the speaker identity, etc. For example, if the confidence level satisfies a confidence level threshold, it may be determined that a detected silence is sufficient (e.g., the length of a pause in the speech exceeds a threshold), that speech is present in the audio input, and that an utterance beginning may be marked. However, if the confidence level does not satisfy the confidence level the beginpointing/audio detection may determine that there is no speech in the audio input. Alternatively, each marked location may be associated with a stored confidence and the system may use the confidence values when a wakeword is detected to determine where to mark a new utterance. For example, if a first location 1 second before a wakeword is associated with a low confidence, but a second location 1.8 seconds before the wakeword is associated with a high confidence, the system may select the second location as the beginning of the utterance for purposes of bounding the utterance for speech processing.

Figure 5:
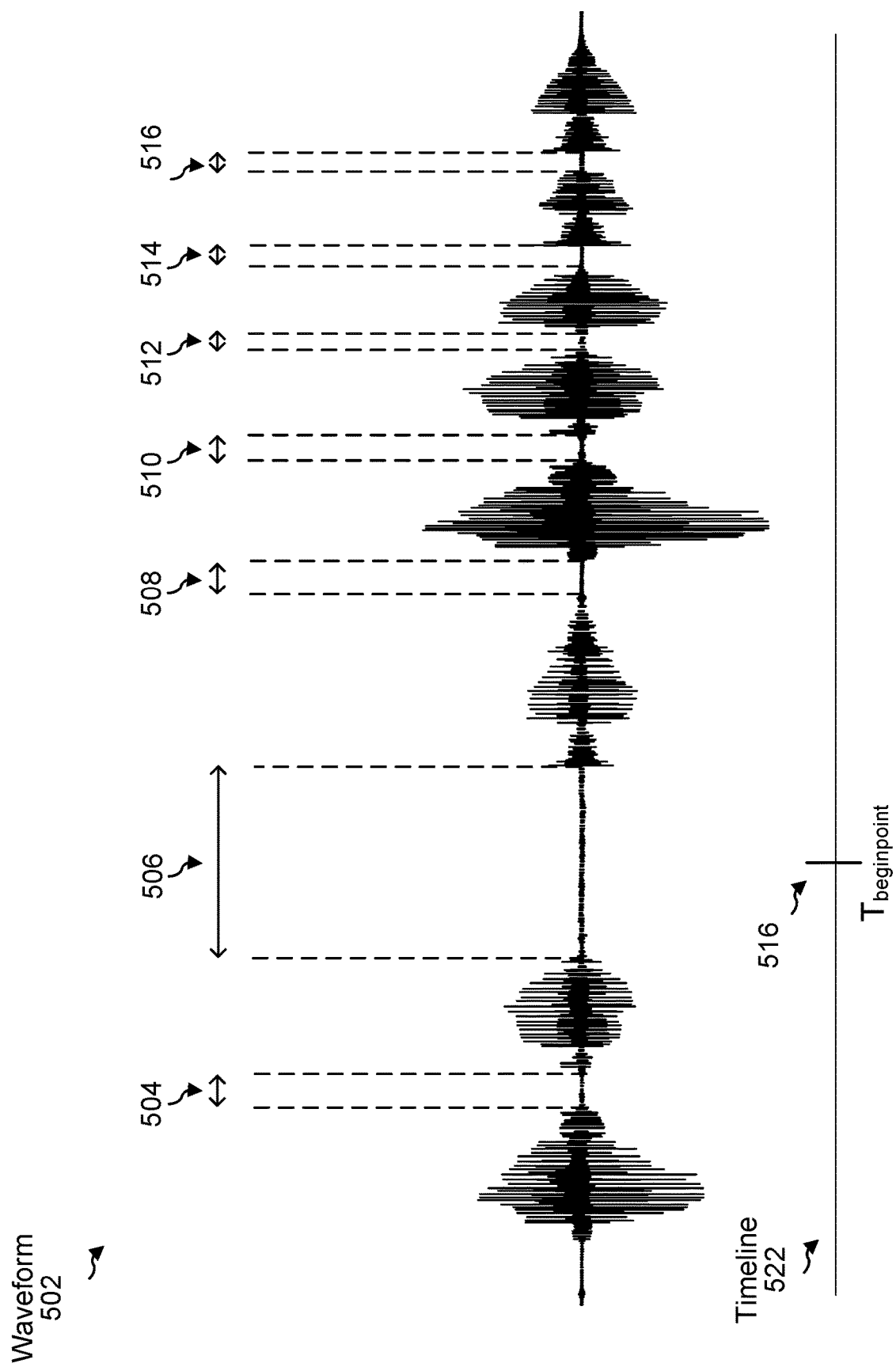
FIG. 5 is an illustration of determining a beginning of an utterance according to embodiments of the present disclosure.

An example of beginpointing is illustrated in FIG. 5. As shown a waveform 502 may be constructed from speech in audio received by one or more microphones 308 of the device. The device may then identify pauses in the speech (by identifying silent periods in the audio). As illustrated, the identified pauses include pauses 504-516. The device may compare the length of each pauses to a threshold length, where the threshold length represents a likelihood that a pause of the threshold length represents a break between utterances. As illustrated, the device may determine that only pause 506 has a length exceeding the threshold, while the other pauses have lengths that do not exceed the threshold (and thus may represent breaks within a same utterance, for example pauses between words). In another example, a particular potential beginpoint (e.g., pause 506) may be detected based on its confidence exceeding a threshold confidence (which may be in addition to or separate from the pause's length exceeding a threshold length). The device may mark the location of the pause, where the location may include the start and stop points of the pause, a center point of the pause, etc. As illustrated in FIG. 5, the device may mark the center of the pause at location Tbeginpoint 516. The location may be marked relative to a timestamp associated with received audio, according to a location in the buffer of the pause, or in some other manner relative to the audio in the buffer and/or the received audio. The location may be marked in the buffer itself or separately stored in memory/storage for later retrieval by the device. The location may also be associated with a confidence score. As noted above, other methods of beginpointing may be used.

The process of beginpointing may be performed by the device for received speech as speech is received, after the speech is stored in the buffer, or at another time. The beginpointing may also occur independently from wakeword detection. That is, beginpoints may be detected, and their location marked before wakewords are detected. As the circular buffer stores audio and overwrites old audio, the locations of beginpoints located in audio that has been overwritten may be discarded. Once a wakeword is detected the system may then uses the identified beginpoints associated with audio/speech stored in the buffer to determine the beginning of the utterance that includes the wakeword.

In one embodiment, the system may send audio data corresponding to multiple different potential beginpoints to a server and allow the server to make a final determination as to which beginpoint marks the actual beginning of the utterance. This may be useful in a case where different beginpoints have similar confidence scores. The device 110 may send a server 120 audio data as well as beginpoint data corresponding to multiple beginpoints and the server may determine which beginpoint to use as the start of the utterance. The same may be true for wakewords and/or endpoints, discussed below.

The audio device 110 may include a wakeword detection module 852 (illustrated below in FIG. 8), which may monitor received input audio and provide event notifications to the speech processing components and/or applications operating on device 110 in response to user utterances of a wake or trigger expression. The speech processing components and/or applications may respond by interpreting and acting upon user speech that follows the wake expression. The wake expression may comprise a word, a phrase, or other sound.

The wakeword detection module 852 receives audio signals and detects occurrences of the wake expression in the audio. This may include detecting a change in frequencies over a specific period of time where the change in frequencies results in a specific audio signature that the system recognizes as corresponding to the wakeword. Wakeword detection may include analyzing individual directional audio signals, such as those processed post-beamforming. In certain embodiments, wakeword detection may be performed by multiple expression recognizers or detectors, corresponding respectively to each of the directional audio signals. The expression recognizers may be configured to identify which of the directional audio signals are likely to contain or represent the wake expression. In some embodiments, the device 110 may be configured collectively to identify a set of the directional audio signals in which the wake expression is detected or in which the wake expression is likely to have occurred.

The device 110 may implement automated speech recognition processing to detect the wakeword (or similarly functional wake expression) in the corresponding directional audio signal. In some cases, implementation of the automated speech recognition by the device 110 may be somewhat simplified in comparison to a full recognition system because of the fact that only a single word or phrase needs to be detected. The wakeword detection module 852 may employ a classifier or other machine learning trained models to determine whether the audio signal includes the wakeword. The wakeword detection module 852 may determine confidence levels or probabilities, indicating relative likelihoods that the wakeword has been detected in the corresponding audio signal(s). For example, a confidence level may be indicated as a percentage ranging from 0% to 100%.

Detection of the wakeword may be directionally based. For example, the device 110 may determine whether the wakeword has been detected in a specific one (or more) directional audio signal resulting from beamforming techniques described above. In certain embodiments, the device 110 may be configured to produce a binary value indicating whether or not the wake expression has been detected or recognized in a particular directional audio signal. Based on this binary indication, the classifier may identify a set of the directional audio signals that contain the wakeword. The classifier may then determine whether a wake expression has been generated by user 10, or by another source, for example the speaker 304 (for example when outputting a song), based on which of the directional audio signals are in the identified set of directional audio signals. Wakewords generated by non-user sources may be ignored by the system 100.

If the device 110 determines that a detected wake expression has been uttered by the user 10, the wakeword module 852 generates or provides a wake event or wake notification. The device may then identify a beginpoint location associated with speech that occurred before the wakeword. The device may determine a timestamp of the wakeword, and then determine one or more beginpoints that occurred prior to the wakeword. The device may also determine the confidence score(s) associated with the beginpoint(s). Using the timestamp of the wakeword, the timestamp/location of the beginpoint, and the audio data in the buffer, the system will determine the beginning of the utterance that includes the wakeword. Thus, upon detection of a wakeword, the device will go backwards through the audio in the buffer to determine the start of the utterance that includes the wakeword. The device will do this using the marked beginpoints in the audio that were marked by the device prior to detection of the wakeword.

Figure 6:
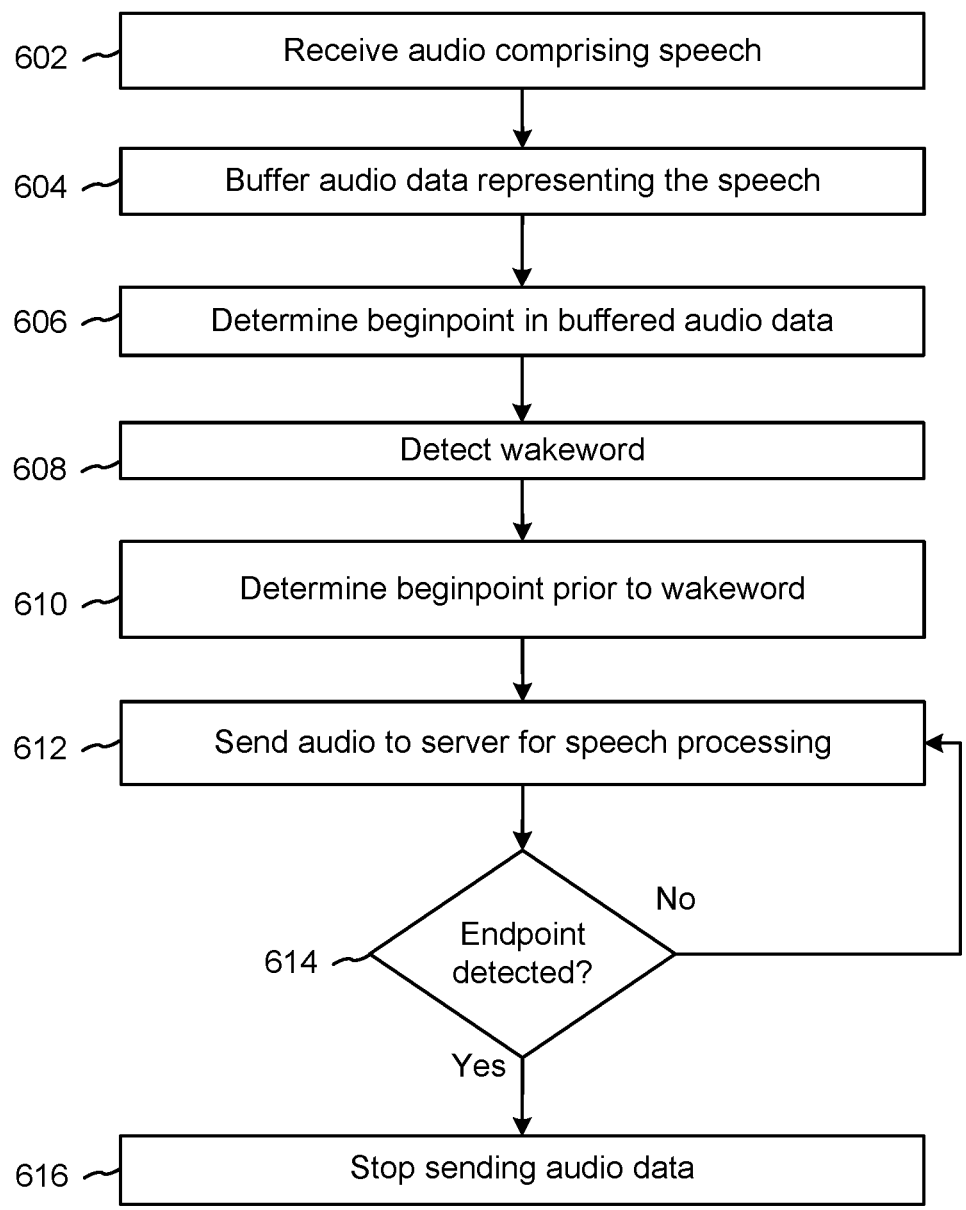
FIG. 6 is a flowchart illustrating locating a wakeword within an utterance according to embodiments of the present disclosure.
Figure 7:
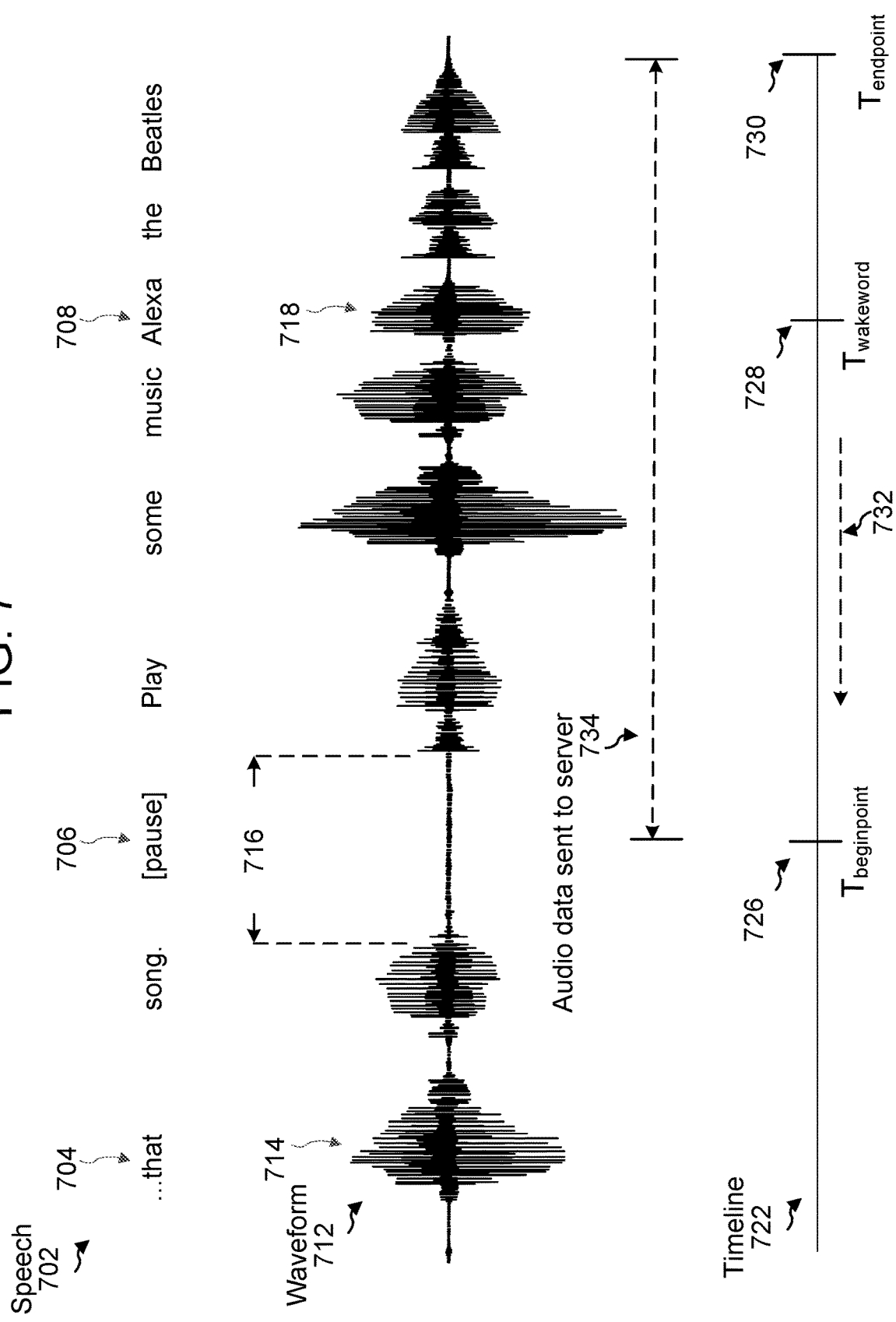
FIG. 7 is an illustration of locating a wakeword within an utterance according to embodiments of the present disclosure.

FIGS. 6-7 illustrates this in further detail. FIG. 6 shows a flowchart illustrating operations of a device 110. Some of those operations are illustrated in further detail in FIG. 7. As shown in FIG. 6, a device may receive (602) audio comprising speech. As shown in FIG. 7, the speech 702 may be spoken by a user and may include multiple different utterances. The portion of the speech illustrated in FIG. 7 is the end of a first utterance "I like that song" and the beginning of a second "Play some music Alexa, the Beatles." In the present illustration, the first word of the speech portion is "that" 704. The speech portion also includes a pause 706 between the utterances. The second utterance also includes a wakeword "Alexa" 708. The device may detect audio including the speech and convert it into audio data. The device may then buffer (604) audio data representing the speech. For example, the device may determine feature vectors, a waveform, or other audio data representing the speech. For illustration purposes, FIG. 7 shows a waveform 712. The waveform may have portions corresponding to "that" (714), to the pause (716) and to the wakeword (718). The device may perform beginpointing to determine (606) a beginpoint in the buffered audio data. The beginpoint is illustrated in FIG. 7 as the break between utterances. As part of the beginpointing the device may determine that the pause corresponds to a beginpoint and may mark the location (726) of the pause, for example on a timeline 722 of the audio. The device may then detect (608) a wakeword. The wakeword may be detect as the audio data is processed, after it is stored in the buffer, or at a different time. In FIG. 7, the portion of the waveform associated with the wakeword is illustrated as 718. The device may then determine (610) a beginpoint that corresponds to a location in the speech prior to the wakeword's location, as shown by arrow 732. As shown in FIG. 7, the wakeword's location is shown on timeline 722 as Twakeword 728. The location of the beginpoint prior to the wakeword is shown as Tbeginpoint 726. The device may then send (612) audio data from the device 110 to the server 120 for speech processing. The sent audio data may begin at the beginpoint location, i.e., may include audio data corresponding to the beginpoint location 726. The device may then determine (614) whether an endpoint is detected. If an endpoint is not detected (614: No), the device may continue to send (612) audio to the server. If an endpoint is detected (614: Yes), for example endpoint Tendpoint 730 as shown in FIG. 7, the device may stop (616) sending audio data. Thus the audio data sent to the server (illustrated as 734 in FIG. 7) will include the audio data from Tbeginpoint 726 to Tendpoint 730. The sent audio data will also include audio data corresponding to the wakeword 708.

Beginpointing and/or endpointing techniques may be combined with beamforming techniques discussed above to determine different beginpoints for different lobes/beams determined by the device. In such an embodiment multiple buffers may be used (for example with each microphone associated with a buffer, each lobe/beam associated with a buffer, etc.). Different beginpoints may be determined using the audio for each microphone/lobe and the respective beginpoint locations (and associated microphone/lobe) stored in the device. When speech is determined in one lobe, the system may not only use beginpoints in that particular lobe, but also beginpoints from other lobes to determine the beginning of an utterance associated with the wakeword. This may be useful, for example, if a speaker is moving relative to the device and/or between lobes while speaking a command utterance. In such a situation a wakeword may be detected in one lobe whereas the beginning of an utterance including the wakeword may be detected in a different lobe. Thus the system may use a beginpoint from any lobe. The confidence score associated with a particular beginpoint/location may thus depend on what lobe the wakeword was detected. For example, if a first beginpoint is associated with a main lobe (for example main lobe 406 shown in FIG. 4), and a second beginpoint is associated with a side lobe (for example side lobe 414 shown in FIG. 4), for a wakeword detected in main lobe 406 the system may use a higher confidence value for the first beginpoint than the second beginpoint. Alternatively, if the system determines that a speaker is moving between lobes (for example in a counterclockwise direction relative to the lobes of FIG. 4), for a wakeword detected in main lobe 406 the system may use a higher confidence value for the second beginpoint than the first beginpoint as the utterance associated with the wakeword may have originated from side lobe 414.

Once a command is detected using the techniques described above, the device 110 may perform endpoint detection (also called endpointing) to determine when the speech (e.g., the utterance) associated with the command has concluded. The complete utterance may then be processed by the device 110 and/or system 100. The process for endpointing may be similar to the process for beginpointing processing discussed above. For example, in known endpoint detection approaches, a speech endpoint detection algorithm may determine if an utterance has terminated based on the number of silence/non-speech audio frames, for instance the number of consecutive silence/non-speech frames. Energy based or acoustic model based VAD may be used in these algorithms. The utterance may be deemed ended when the voice activity detector sees a certain number of non-speech audio frames. Machine learning techniques may also be used for endpointing. As with initial detection of speech, endpoint determination may be performed by determining an energy level of the audio input. Some endpointing embodiments may apply VAD techniques, such as harmonicity detection. Other embodiments may involve HMM or GMM techniques, or other techniques, such as those discussed above with regard to beginpointing.

Various machine learning techniques may be used to determine a beginning of an utterance, an end of an utterance, a wakeword, or other determinations discussed above. Such techniques may include, for example neural networks, inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training example utterances may be used during training.

Training examples of sample utterance audio along with labeled ground truths about utterance beginnings, utterance conclusions, existence of wakewords, existence/lengths of pauses, etc. may be used to training machine learning models for use at runtime to make such determinations.

Figure 8:
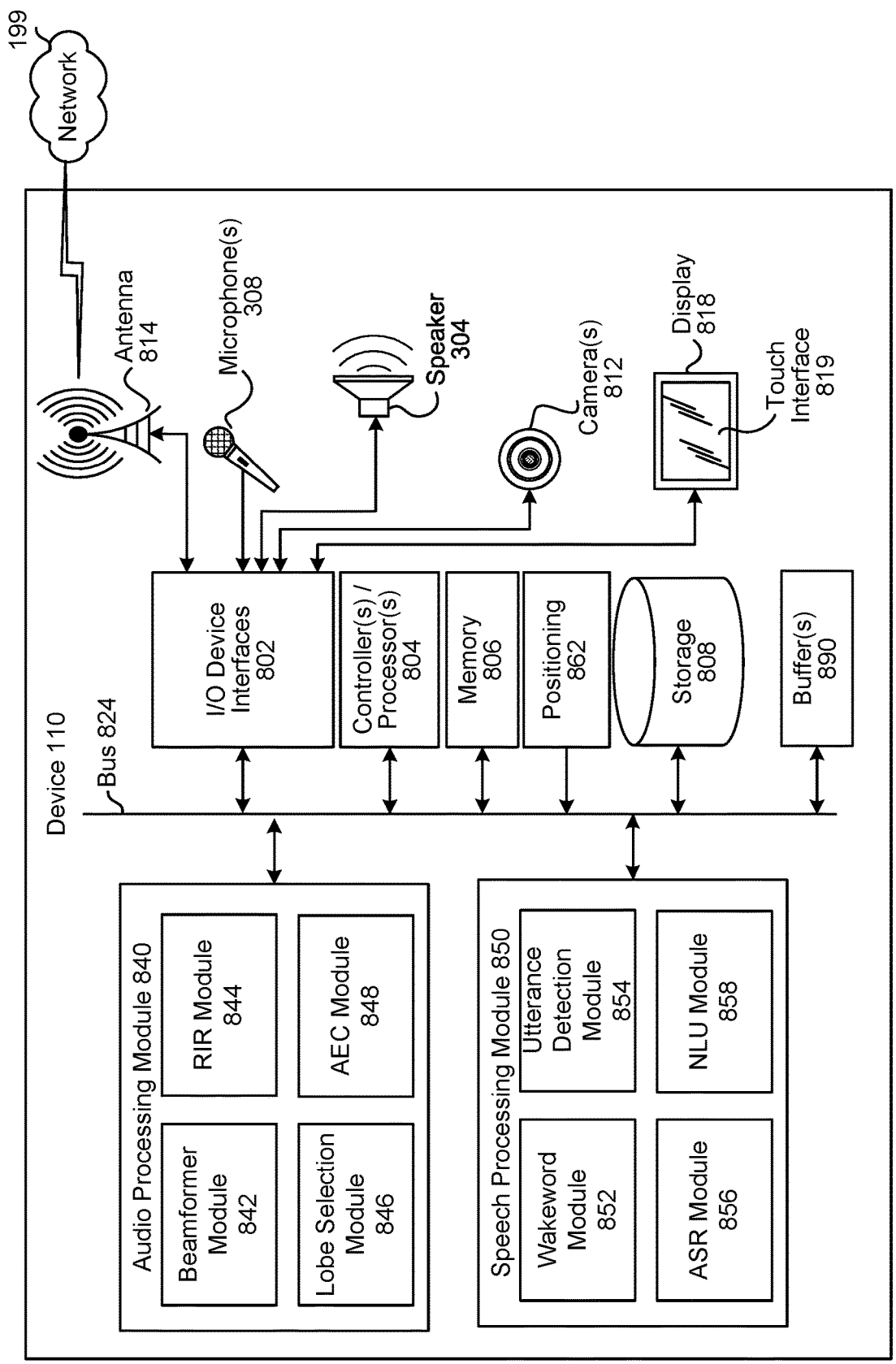
FIG. 8 is a block diagram conceptually illustrating example components of a device according to embodiments of the present disclosure.
Figure 9:
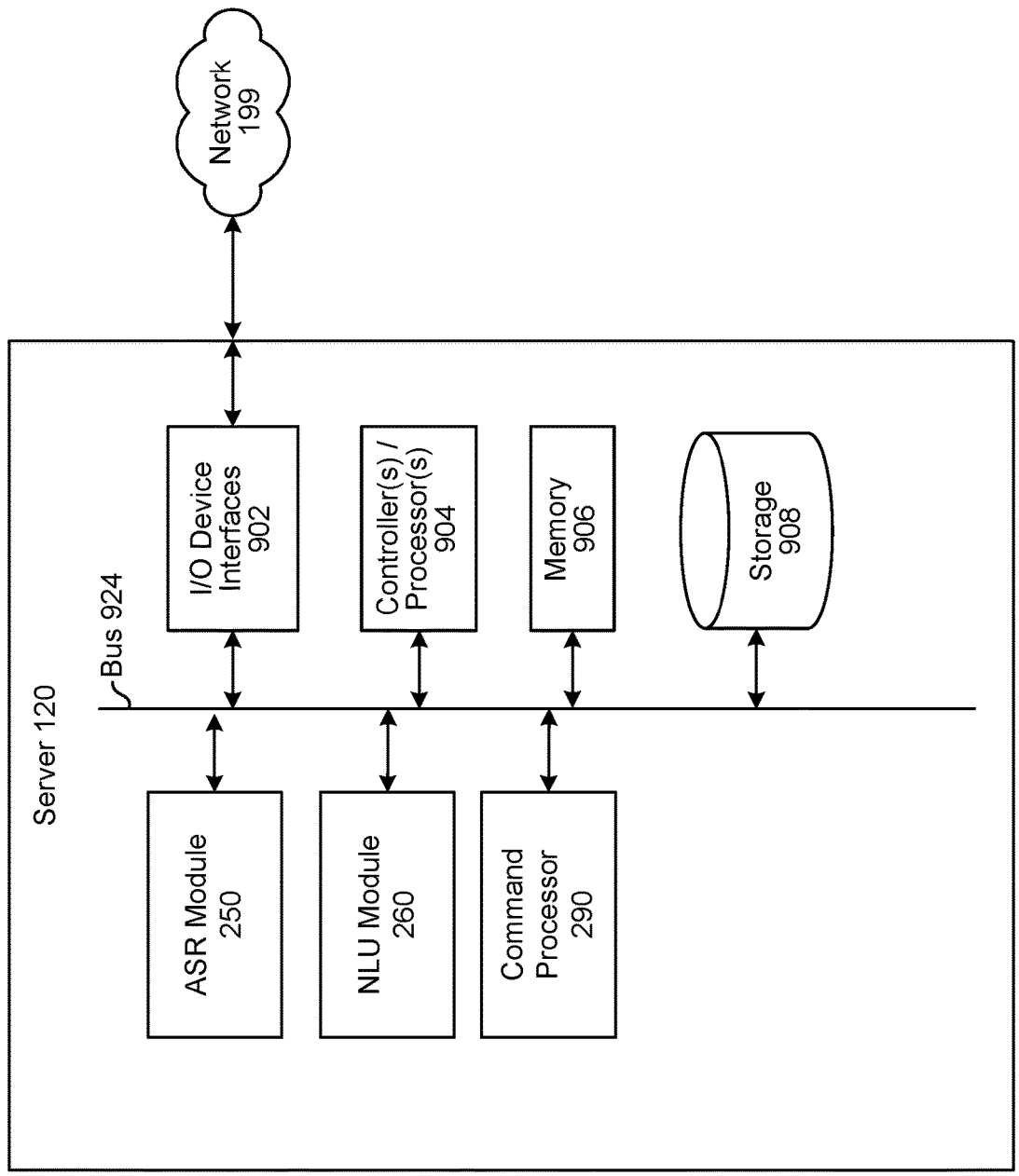
FIG. 9 is a block diagram conceptually illustrating example components of a server according to embodiments of the present disclosure.

FIG. 8 is a block diagram conceptually illustrating a local device 110 that may incorporate certain speech receiving/processing capabilities. FIG. 9 is a block diagram conceptually illustrating example components of a remote device, such as a remote server 120 that may assist with ASR and/or NLU processing. Multiple such remote devices may be included in the system, such as one remote device for ASR, one remote device for NLU, etc. In operation, each of these devices may include computer-readable and computer-executable instructions that reside on the respective device (110/120), as will be discussed further below.

Each of these devices (110/120) may include one or more controllers/processors (804/904), that may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive (MRAM) and/or other types of memory. Each device may also include a data storage component (808/908), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (802/902).

Computer instructions for operating each device (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120) includes input/output device interfaces (802/902). A variety of components may be connected through the input/output device interfaces, as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Referring to the speech-controlled appliance 110 in FIG. 8, the input/output device interfaces 802 connect to a variety of components such as a microphone 308 or microphone array 302, a speaker or speaker(s) 304, camera(s) 812 (or other image capture components), and one or more antennas 814 supporting wireless communication. Via the antenna(s), the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 may include a positioning module 862 that provides an interface for acquiring location information, such as information from satellite geographic positioning system(s). For example, the global positioning module 862 may include a Global Positioning System (GPS) receiver and/or a Global Navigation Satellite System (GLONASS) receiver. The global positioning module 862 may also acquire location-based information using other radio sources (e.g., via antenna 814), such as mapping services that triangulate off of known WiFi service set identifiers (SSIDs) or cellular towers within range of the device 110.

As illustrated, the device 110 may include, or otherwise have access to an audio processing module 840. The audio processing module 840 may include a beamformer module 842, a room impulse response (RIR) determination module 844, a lobe-selection module 846, and an acoustic echo cancelation (AEC) module 848.

The beamformer module 842 functions to create beampatterns, or effective directions of gain or attenuation. As illustrated and described below, the beampatterns include multiple lobes, each altering a gain from a respective region within the environment of the device 110. The beamformer module 842, or another component, may also be configured to perform blind source separation which may coordinate audio signals from multiple microphones in a more separated ad hoc array (for example, multiple microphones spread around a room rather than in a fixed array configuration on a single device) to determine a location of a speech source.

The RIR determination module 844, meanwhile, may function to determine a room impulse response (RIR) of the environment relative to the device 110 and may store the RIR in the storage 808. In some instances, the module 844 associates each RIR with a timestamp such that a history of the RIRs of the environment is maintained. To determine an RIR, the module 844 may instruct the speaker 304 to emit a known sound within the environment. The microphones 308 then capture sound of the known sound that is reflected by the environment (e.g., off walls, the ceiling, the floor, objects, etc.). The microphones 308 may then capture an audio signal based on this reflected sound and the RIR determination module 844 may compare the known sound to the reflected sound represented by the captured audio signal to identify variations there between. The RIR determination module 844 then calculates an RIR of the environment based on these variations and stores this information in the storage 808. As is known, this measured RIR may indicate a level of echo coming from different directions relative to the device 110, which aids in the device 110 determining if it is near a wall, corner, or other object that occupies a lobe of a particular beampattern.

The lobe-selection module 846, meanwhile, functions to select one or more lobes of a beampattern to enhance based on the RIR of the environment, described above, as well as with reference to a history of lobes that have previously been found to include user speech. For instance, because the RIR may indicate when the device 110 is near a wall or other occluding object, and the direction of that wall or object relative to the device 110, the lobe-selection module may take that into account when determining which lobes of a beampattern to enhance.

In addition to referencing the RIR, the lobe selection module 846 may reference a history of which lobes have previously been found to include user speech. That is, if particular lobe(s) of a beampattern correspond to regions of an environment that have been found to often include user speech, then the lobe selection module 846 may increase the likelihood that these particular lobes will be enhanced. For instance, the lobe-selection module 846 may analyze the storage 808 to identify which lobes have previously been found to include user speech a threshold number of times or a threshold percentage of the time. Additionally or alternatively, the module 846 may identify the lobe(s) that have most recently been found to include user speech (e.g., may identify the lobe that was last found to include user speech).

The lobe-selection module 846 may then use the RIR measurement, the heuristics associated with previous lobe-selections, and an amount of energy associated with each lobe to select one or more lobes to enhance. The AEC module 848 may perform echo cancellation. The AEC module 848 compares audio that is output by the speaker(s) 304 of the device 110 with sound picked up by the microphone array 302 (or some other microphone used to capture spoken utterances), and removes the output sound from the captured sound in real time. Echo cancellation is commonly used by cellular telephones and other telephones operating as speaker phones, and facilitates the ASR process by removing a component of captured sounds that can interfere with speech recognition. The AEC module 848 may also work with other components, for example may apply more processing resources to preparing the portion of the audio signal corresponding to the selected lobes as compared to a remainder of the audio signal. Although illustrated as part of the audio processing module 840, the AEC, and/or it functionality may be located elsewhere, for example in ASR module 250, ASR module 856, etc. The output of the audio processing module 840 may be sent to the AFE 256, to the speech processing module 850, or to other components.

The device 110 includes a speech processing module 850 which may operate in conjunction with the audio processing module 840.

The speech processing module 850 may include a wakeword detection module 852. The wakeword detection module may perform wakeword detection as described above. The speech processing module 850 may include a utterance detection module 854. The utterance detection module 854 (or some other component) may also be configured to perform beginpoint detection and/or endpoint detection as described above.

The speech processing module 850 may include a limited or extended ASR module 856. The ASR module 856 may include the language models 254 stored in ASR model storage component 252, and an ASR module 250 that performs the automatic speech recognition process. If limited speech recognition is included, the speech recognition engine within ASR module 856 may be configured to identify a limited number of words, such as wake words of the device, whereas extended speech recognition may be configured to recognize a much larger range of words. The device may also include a limited or extended NLU module 858 that may include certain NLU functions or may include expanded NLU functionality, such as described above in reference to NLU module 260.

The device 110 may also include buffer(s) 890 which may store data used by the wakeword module 852, utterance detection module 854, or other components as described above. The buffer may be a non-transitory memory. The buffer(s) may be configured to hold a limited amount of speech (for example 10-30 seconds) to avoid capturing too much speech and causing privacy concerns.

As illustrated in FIG. 9, one or more servers 120 may include the ASR module 250, the NLU module 260, and/or a command processor 290. The command processor 290 may be configured to execute commands associate with an utterance.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 8 and 9, are exemplary, and may be located a stand-alone device or may be included, in whole or in part, as a component of a larger device or system.

Figure 10:
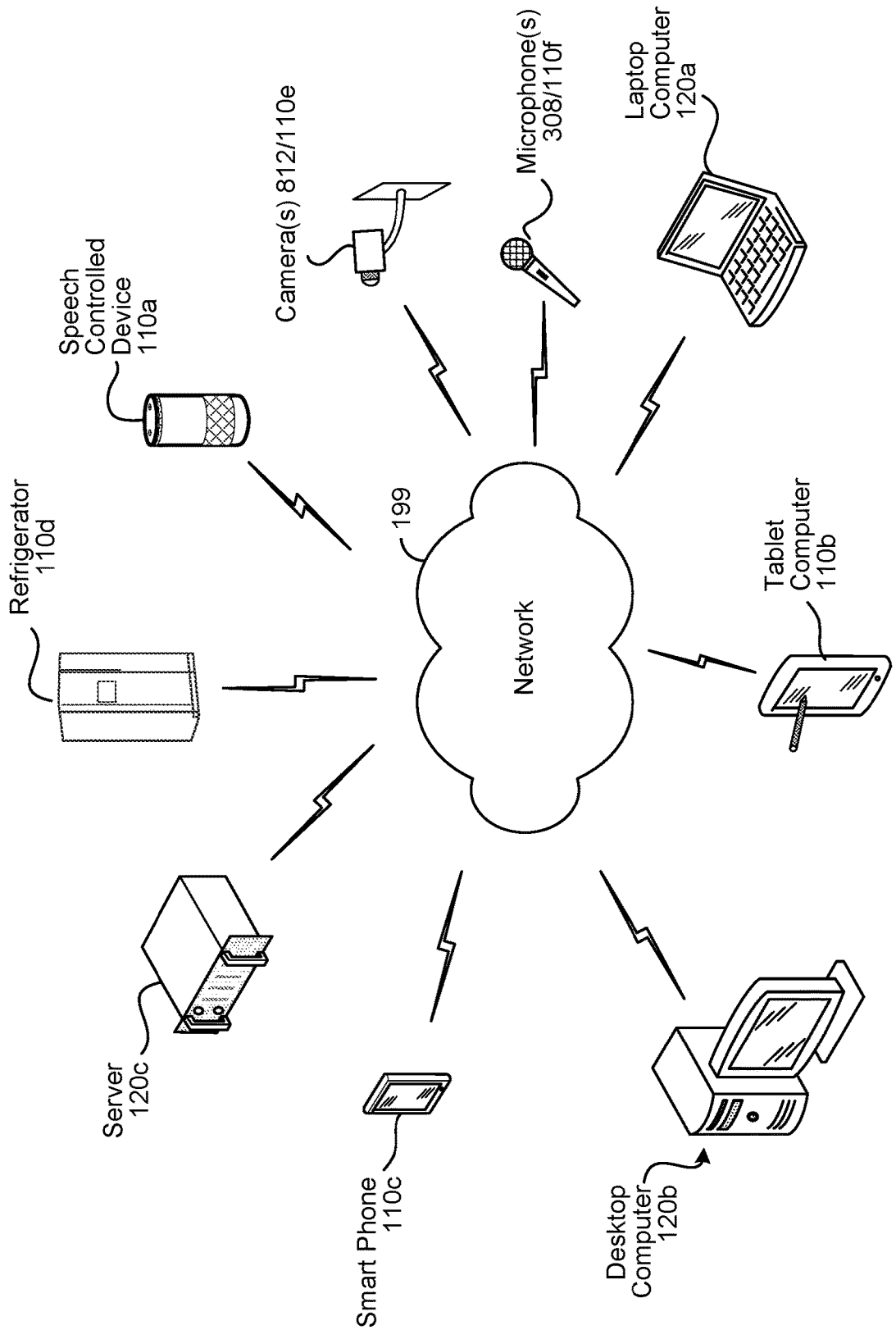
FIG. 10 illustrates an example of a computer network for use with the system.

As illustrated in FIG. 10, multiple devices (110*a*-110*d* and 120*a*-120*c*) may contain components of the system 100 and the devices may be connected over a network 199. The network 199 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies. Devices may thus be connected to the network 199 through either wired or wireless connections. Network 199 may include a local or private network or may include a wide network such as the internet. For example, a speech controlled device 110*a*, a tablet computer 110*b*, a smart phone 110*c*, a refrigerator 110*d*, networked camera(s) 812/110*e* (which may also include one or more microphones), networked microphone(s) 308/110*f* (or networked microphone array(s), not illustrated) may be connected to the network 199 through a wireless service provider, over a WiFi or cellular network connection or the like. Other devices are included as network-connected support devices, such as laptop computer 120*a*, desktop computer 120*b*, and a server 120*c*. The support devices 120 may connect to the network 199 through a wired connection or wireless connection. Networked devices 110 may capture audio using one-or-more built-in or connected microphones 308 or audio capture devices, with processing performed by ASR, NLU, or other components of the same device or another device connected via network 199, such as an ASR 250, NLU 260, etc. of one or more servers 120*c*.

The concepts disclosed herein may be applied within a number of different devices and computer systems, including, for example, general-purpose computing systems, speech processing systems, and distributed computing environments. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving audio comprising speech;
   storing, in non-transitory memory, audio data representing the audio;
   determining based on the audio data that at least a portion of the speech was directed at a device;
   determining a first portion of the audio data, stored in the non-transitory memory, corresponding to the speech directed at the device, wherein the first portion of the audio data includes audio data representing speech that occurred prior to the audio data used to determine that at least a portion of the speech was directed at the device; and
   sending the first portion of the audio data for further processing.

2. The computer-implemented method of claim 1, further comprising:
   sending the first portion of the audio data to a first component for speech processing.

3. The computer-implemented method of claim 2, wherein sending the first portion of the audio data to a first component for speech processing comprises:
   sending the first portion of the audio data to a remote device.

4. The computer-implemented method of claim 1, wherein determining at least a portion of the speech was directed at the device comprises:
   determining the speech comprises a wakeword.

5. The computer-implemented method of claim 1, further comprising:
   determining a pause represented in the audio data;
   determining that the pause occurs prior to the first portion of the audio data and after a second portion of the audio data; and
   determining a beginning of the first portion based at least in part on the pause.

6. The computer-implemented method of claim 5, further comprising:
   refraining from sending the second portion of the audio data for speech processing.

7. The computer-implemented method of claim 1, further comprising:
   determining a pause represented in the audio data;
   determining that the pause occurs after the first portion of the audio data and before a second portion of the audio data; and
   determining an ending of the first portion based at least in part on the pause.

8. The computer-implemented method of claim 7, further comprising:
   refraining from sending the second portion of the audio data for speech processing.

9. The computer-implemented method of claim 1, further comprising, after sending the first portion of the audio data for further processing:
   determining further audio following the speech;
   determining the further audio is not directed at the device; and
   in response to determining the further audio is not directed at the device, stopping sending audio data for further processing.

10. The computer-implemented method of claim 9, wherein determining the further audio is not directed at the device comprises:
    detecting a pause following the speech.

11. A system comprising:
    at least one processor; and
    at least one memory comprising instructions that, when executed by the at least one processor, cause the system to:
      receive audio comprising speech;
      store, in non-transitory memory, audio data representing the audio;
      determine based on the audio data that at least a portion of the speech was directed at a device;
      determine a first portion of the audio data, stored in the non-transitory memory, corresponding to the speech directed at the device, wherein the first portion of the audio data includes audio data representing speech that occurred prior to the audio data used to determine that at least a portion of the speech was directed at the device; and
      send the first portion of the audio data for further processing.

12. The system of claim 11, wherein the at least one memory further comprises instructions that, when executed by the at least one processor, further cause the system to:
    send the first portion of the audio data to a first component for speech processing.

13. The system of claim 12, wherein the instructions that cause the system to send the first portion of the audio data to a first component for speech processing comprise instructions that, when executed by the at least one processor, further cause the system to:
    send the first portion of the audio data to a remote device.

14. The system of claim 11, wherein the instructions that cause the system to determine at least a portion of the speech was directed at the device comprise instructions that, when executed by the at least one processor, further cause the system to:

determine the speech comprises a wakeword.

15. The system of claim 11, wherein the at least one memory further comprises instructions that, when executed by the at least one processor, further cause the system to:

determine a pause represented in the audio data;

determine that the pause occurs prior to the first portion of the audio data and after a second portion of the audio data; and determine a beginning of the first portion based at least in part on the pause.

16. The system of claim 15, wherein the at least one memory further comprises instructions that, when executed by the at least one processor, further cause the system to:

refrain from sending the second portion of the audio data for speech processing.

17. The system of claim 11, wherein the at least one memory further comprises instructions that, when executed by the at least one processor, further cause the system to:

determine a pause represented in the audio data;

determine that the pause occurs after the first portion of the audio data and before a second portion of the audio data; and determine an ending of the first portion based at least in part on the pause.

18. The system of claim 17, wherein the at least one memory further comprises instructions that, when executed by the at least one processor, further cause the system to:

refrain from sending the second portion of the audio data for speech processing.

19. The system of claim 17, wherein the at least one memory further comprises instructions that, when executed by the at least one processor, further cause the system to, after sending the first portion of the audio data for further processing:

determine further audio following the speech;

determine the further audio is not directed at the device; and in response to determination that the further audio is not directed at the device, stop sending audio data for further processing.

20. The system of claim 19, wherein the instructions that cause the system to determine the further audio is not directed at the device comprise instructions that, when executed by the at least one processor, further cause the system to:

detect a pause following the speech.

* * * * *